United States Patent [19]

Decker et al.

[11] 4,195,603
[45] Apr. 1, 1980

[54] ELECTRONICALLY SELF-CONTROLLED IGNITION SYSTEM FOR INTERNAL COMBUSTION ENGINES

[75] Inventors: Heinz Decker, Vaihingen; Gerhard Söhner, Remshalden, both of Fed. Rep. of Germany

[73] Assignee: Robert Bosch GmbH, Stuttgart, Fed. Rep. of Germany

[21] Appl. No.: 776,734

[22] Filed: Mar. 11, 1977

[30] Foreign Application Priority Data

May 3, 1976 [DE] Fed. Rep. of Germany ....... 2619443

[51] Int. Cl.² .............................................. F02P 5/04
[52] U.S. Cl. .................................................. 123/117 R
[58] Field of Search .................................... 123/117 R

[56] References Cited
U.S. PATENT DOCUMENTS

| | | | |
|---|---|---|---|
| 3,952,715 | 4/1976 | Van Siclen, Jr. | 123/117 R |
| 3,964,454 | 6/1976 | Nishimiya | 123/117 R |
| 3,989,024 | 11/1976 | Lai et al. | 123/117 R |
| 4,008,698 | 2/1977 | Gartner | 123/117 R |
| 4,015,566 | 4/1977 | Wahl | 123/117 R |

Primary Examiner—Charles T. Jordan
Attorney, Agent, or Firm—Frishauf, Holtz, Goodman, Woodward

[57] ABSTRACT

An inductive transducer having an electromagnetic inductive pickup coil in flux linking relationship to a rotary electromagnetic armature provides spaced output pulses to control current flow, and subsequent interruption of current through an ignition coil; to automatically increase the time during which current can flow through the coil, and change ignition timing, an impedance load circuit is connected to the inductive transducer through a control switch, so that the output characteristic of the inductive transducer is changed when the control switch is operated; the control switch may be speed dependent, or automatically speed dependent by the inclusion of a Zener diode which becomes conductive when the output voltage from the transducer rises, for example as speed of the engine, and hence of the transducer increases.

10 Claims, 3 Drawing Figures

ELECTRONICALLY SELF-CONTROLLED IGNITION SYSTEM FOR INTERNAL COMBUSTION ENGINES

CROSS REFERENCE TO RELATED APPLICATIONS AND PATENT

U.S. Ser. No. 776,739, filed Mar. 11, 1977, now U.S. Pat. No. 4,114,582; RABUS et al; U.S. Ser. No. 776,740, filed Mar. 11, 1977 now U.S. Pat. No. 4,112,890, Sept. 12, 1978; MANGER et al; U.S. Ser. No. 776,738, filed Mar. 11, 1977; RABUS et al; U.S. Ser. No. 776,735, filed Mar. 11, 1977; GRATHER et al all assigned to the assignee of the present invention. U.S. Pat. Nos. 3,630,185 and 3,881,458.

The present invention relates to an ignition system for internal combustion engines which is self-controlled, that is, in which the time of current flow, corresponding to the dwell angle of current flow through an ignition coil is automatically adjusted to adjust ignition timing with respect to predetermined operating parameters of the engine, for example speed.

It has previously been proposed to use inductive transducers to provide output pulses which determine the initiation of current flow through an ignition coil and termination of current flow therethrough, resulting in a sharp pulse which provides the ignition pulse to initiate an ignition event. As usual, the ignition system has a primary circuit including the primary winding of the ignition coil and an electrical switch, typically a transistor; the secondary of the ignition coil is connected, for example through a distributor, to one or more spark gaps, typically spark plugs. Ignition systems having inductive transducers which provide output pulses controlling the timing of current flow have been described in the literature U.S. Pat. No. 3,630,185. Ignition timing can be changed within certain speed ranges. As disclosed in the aforementioned patent, the inductive transducer has two winding ranges which are electrically dissimilar. The ranges of the windings are connected through diodes with a control electrode of the switch, typically a transistor, in the primary of the ignition coil. Two voltage half waves of similar polarity thus are being applied to the control electrode of the switch; the first of the two half waves has a lower peak value which rises above the threshhold response of the switch only after the engine has reached a predetermined speed and can be used, therefore, only then, and during high speed operation of the engine. This lower pulse, then, changes the ignition timing.

Constructing a transducer with two dissimilar electrical winding, or tapping the winding is comparatively complicated and, additionally, such transducers cannot be used universally in various types of internal combustion engines, but must be individually designed to match a specific engine having specific speed-ignition characteristics.

It is an object of the present invention to provide an ignition system in which a simple transducer can be used in which, nevertheless, provides, automatically, for changing of the ignition timing as an operating parameter of the engine changes, typically speed.

Subject matter of the present invention

Briefly, the inductive transducer is connected to an impedance load element which can be selectively connected thereto, or not; connection of the impedance load element is controlled in accordance with the parameter desired to be the specific controlled parameter to change the ignition timing. In a simple form, this parameter is engine speed and, as engine speed increases, the impedance load element is connected to the transducer above a certain speed limit to thereby extend the time of current flow through the coil and retard the spark while also providing sufficient spark energy to the spark plugs.

The ignition system has the advantage with respect to the inductive transducer disclosed in the aforementioned U.S. Pat. No. 3,630,185 that changing of ignition timing can be obtained simply and without changing the transducer itself. Thus, by mere exchange of the particular impedance load element with another, the system can readily be matched to various types of internal combustion engines. Exchanging the impedance load element for another is simple.

The impedance load element can easily be connected in circuit with the inductive transducer when the controlled switch is a voltage dependent switch, such as a Zener diode which becomes effective when the output voltage from the transducer rises above a predetermined value, which occurs when the speed of the engine exceeds a certain speed level.

Drawings

Illustrating an example:

Figure 3:
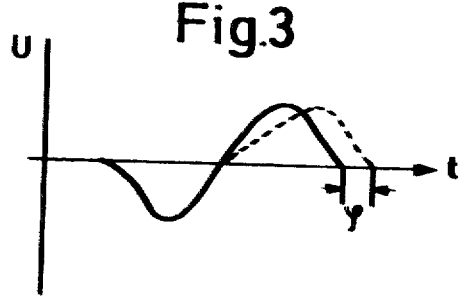
FIG. 3 is a voltage (ordinate)—time (abscissa) diagram used in connection with the explanation of the system.

An inductive transducer 10 (FIG. 1) coupled, for example, to the crankshaft of the engine shown schematically only as block E has a star wheel, or other electromagnetic rotating element 110 which rotates in synchronism with rotation of the engine. A fixed inductive transducer 111 is located to be electromagnetically responsive to the rotating element 110 and to provide an output pulse, as illustrated in FIG. 3, when the marker on the rotating element 110 passes the fixed transducer 111. The output from transducer 10 is available at the terminal 11; terminal 11 is connected to a wave shaping stage 12, preferably a Schmitt-trigger providing a square wave output. The output of wave shaping stage 12 is connected through a dwell angle control stage 13 with the control input of an electrical switch 14, preferably constructed as a transistor. The dwell angle control stage is provided to insure that the interrupter switch 14 is closed at the proper time to provide for sufficient current flow through the primary of ignition coil 16 from a voltage source 15. A dwell angle control stage suitable for this purpose is disclosed, for example, in U.S. Pat. No. 3,881,458. The secondary winding of the ignition coil 16 is connected to the spark gap 17, typically a spark plug of an internal combustion engine; for multicylinder engines, a distributor can be interposed between spark plug 16 and spark plugs 17, as well known.

In accordance with the invention, an impedance element 20 is connected as a load to the output terminal 11 of transducer 10. Impedance element 20 may be an ohmic resistor, a capacitor, or a combination of resistor-capacitor elements. The impedance element 20 is selectively connected to terminal 11 through a controlled switch 18, the output terminal 19 of which forms the input of impedence element 20.

A speed sensing circuit 21, forming a standard tachometer generator, as well known in use with automotive vehicles provides an output signal which is connected to a threshhold stage 22 to provide an output pulse when a certain speed is exceeded. The tachometer generator 21 is connected to output terminal 11 of the transducer 10. It is not necesssary that the tachometer generator 21 thus operation as an engine speed sensor, be connected to the output of the transducer 10; it may be connected at other points in the ignition system or otherwise to the vehicle or to the drive train thereof to provide signals proportional to engine speed. For example, tachometer generator 21 can be connected to the output of wave shaping stage 12.

Operation, with reference to FIG. 3: the voltage U of transducer 10 is transformed into the square wave signal by wave shaping stage 12. The dwell angle control stage 13 so changes, or processes this signal that the beginning of the output signal from wave shaping stage 12, which also is the ignition instant at which time an ignition event is to be initiated, corresponds approximately with the end of an output signal from the dwell angle control stage 13. The beginning, or leading flank of the output signal from the dwell angle control stage is determined by the preceding output signal from wave shaping stage 12 in such a manner that the length of the control signal from the dwell angle control stage and applied to the switch 14 is sufficient to pass current through the primary of the ignition coil to bring the coil 16 into saturation. When the output signal from control stage 13 terminates, that is, at the ignition instant, switch 14 opens and the resulting inductive kick from ignition coil generates a spark at the spark plug 17.

The width of the pulse from stage 12, and hence the width of the pulse from stage 13 is determined by the wave derived from the transducer 10.

Figure 1:
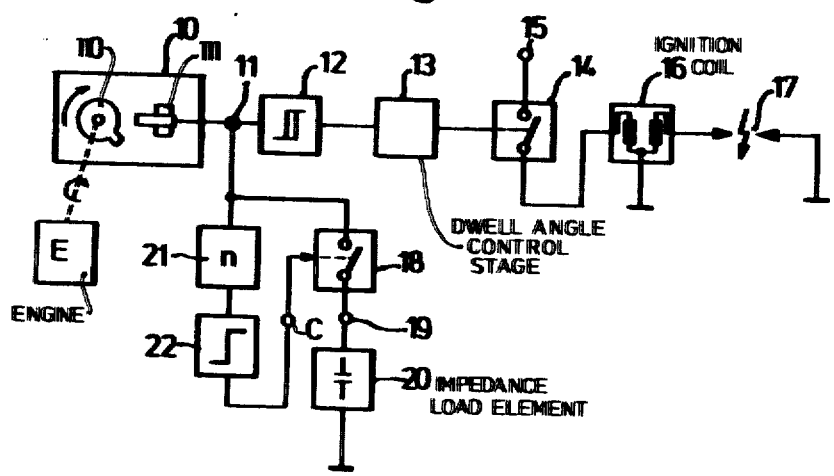
FIG. 1 shows a schematic diagram of one embodiment of the invention.
Figure 2:
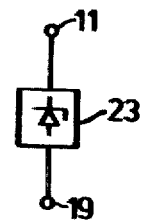
FIG. 2 is a fragmentary diagram illustrating a modification of the system.

Let it be assumed that switch 18, connected to impedance load element 20 is open. This is the condition for lower speed ranges. At low engine speeds, then, transducer 10 has only the input impedance of circuit 12 connected thereto, and possibly, the input impedance of circuit 21, which is fixed and can be set to be very high so that transducer 10 is only lightly loaded. The phase shift of the output signal from transducer 10, as connected to terminal 11 is thus very slight with respect to the output signal from transducer 10 when unconnected, or free running. The resulting output voltage from transducer 10, connected as shown in FIG. 1 and with switch 18 open is shown by the solid line curve of FIG. 3. As the speed rises, tachometer generator 21 provides an increasing speed signal until threshhold switch 22 responds. The output of threshhold switch 22 is available at a control terminal C which is applied to the input terminal of switch 18, to cause closing of switch 18. From that point on, the impedance load element 20 is connected to the output circuit of transducer 10 and forms an additional impedance load. Electromagnetic transducers, such as all a-c generators experience a phase shift in voltage with respect to unloaded voltage due to armature reactions. This external loading is provided by the impedance load element 20. A phase shift $\phi$ will result; the output voltage, when loaded, is shown by broken line in FIG. 3. This phase shift increases as the speed increases; as the output amplitude of the transducer 10 increases, with increasing speed, loading causes an increasing armature reaction and hence an increase in phase shift. Simultaneously with the phase shift $\phi$, the output signals from the wave shaping stage 12 as well as from the dwell angle control stage 13 will shift, resulting in a knee in the ignition timing characteristic. Decreasing the ignition advance set into the system, for example, by the dwell angle control stage 13 from a predetermined speed level on up can be used to limit the upper speed of the engine, and thus provide protection against overspeeding and, eventually, run-away. Introduction of the impedance load element into the output circuit of the inductive transducer 10 can be effected automatically, dependent upon speed. As seen in FIG. 2, the circuit between terminal 11 and terminal 19 is broken and, instead, the circuit 23 including a Zener diode is inserted therein. Circuit 23, in its most simple case a Zener diode, forms a threshhold switch. At low speed, the output amplitude of the voltage from transducer 10 is small and Zener diode 23 is blocked. When the amplitude of the output voltage from transducer 10 exceeds a certain value—the breakdown voltage of the Zener diode—which forms the threshhold voltage of the threshhold switch 23, the Zener diode becomes conductive and the impedance load element 20 will, effectively, be connected to the transducer 10 as an additional load. This loading, as described in the above, will change the phase of the output from the transducer 10.

The impedance load element 20 can be connected, or disconnected, selectively, from the inductive transducer by various signals and the invention is not limited to using speed as a controlling parameter. Other signals applied to terminal C (FIG. 1) and dependent on operation, or operating parameters of the engine can be used to modify the output voltage and particularly the phase wave shape of the output voltage derived from the transducer 10. Terminal C, FIG. 1, thus can be a general input terminal for a sensor sensing a controlled operating parameter of the engine which, selectively, connects the impedence load element 20 in circuit with the transducer to modify the output voltage derived therefrom, and hence the ignition timing.

Various changes and modifications may be made within the scope of the inventive concept.

We claim:

1. Electronically self-controlled ignition system for an internal combustion engine (E) having
   an ignition coil (16);
   a controlled switch (14) serially connected with a primary winding of the ignition coil (16);
   a spark gap (17) connected to the secondary winding of the ignition coil (16);
   and comprising the combination
   of an inductive transducer (10) coupled to the engine and rotating in synchronism therewith, the inductive transducer providing output signals to the controlled switch (14) to respectively connect, and disconnect current from a source to the ignition coil, with
   an impedance load element (20) and means (18, 21, 22,C; 23) responsive to and controlled by an engine operation sensor responsive to an operating parameter of the engine selectively connecting said impedance load element (20) to the inductive transducer (10) to selectively connect a load to the transducer and thereby cause phase shift of the output thereof and hence change in the phase of the output signals from the inductive transducer in accordance with the selective connection of said impedance load element thereto.

2. System according to claim 1, wherein the selective connection means comprises a threshhold switch (23).

3. System according to claim 2, wherein the threshhold switch comprises a Zener diode.

4. System according to claim 1, wherein the selective connection means comprises a controlled switch (18) having a controlled input a threshold switch (22) connected to the controlled input of said switch;

and means (21;C) responsive to and controlled by the engine operation sensor responsive to a parameter of operation of the engine providing an input signal to the threshold switch.

5. System according to claim 1, wherein the engine operation sensor comprises a tachometer generator (21) connected to provide an output signal representative of engine speed;

a threshhold switch (22) having the output of the tachometer generator applied thereto and providing an output signal when the speed of the engine exceeds a predetermined speed value;

and a control switch (18), connected to and controlled by the threshhold switch and, selectively, connecting said impedence load element (20) to the inductive transducder (10) in dependence on an output signal from the threshhold circuit (22).

6. System according to claim 1, wherein the selective connection means comprises a controlled switch (18);

and input means (C) responsive to and controlled by the engine operation sensor connected to said controlled switch and, selectively, commanding closing or opening of said switch and, hence, selectively connection or disconnection of said impedance load element (20) from the inductive transducer.

7. System according to claim 1, wherein the impedance load element comprises an ohmic load.

8. System according to claim 1, wherein the impedance load element comprises a capacitative reactive load.

9. System according to claim 1 wherein the sensor comprises a speed sensing circuit (21) connnected to said inductive transducer (10) to provide an output signal representative of the speed of the engine, engine speed forming said operating parameter.

10. System according to claim 1, wherein the impedance load element comprises a capacitative reactive and resistive load.

* * * * *